US009600847B2

(12) United States Patent
Betancourt

(10) Patent No.: US 9,600,847 B2
(45) Date of Patent: Mar. 21, 2017

(54) METHOD AND SYSTEM FOR MANAGING AND MONITORING FUEL TRANSACTIONS

(71) Applicant: Epona LLC, Franklin, TN (US)

(72) Inventor: Ernest Blas Betancourt, Lascassas, TN (US)

(73) Assignee: Epona LLC, Franklin, TN (US)

( * ) Notice: Subject to any disclaimer, the term of this patent is extended or adjusted under 35 U.S.C. 154(b) by 35 days.

(21) Appl. No.: 14/524,190

(22) Filed: Oct. 27, 2014

(65) Prior Publication Data

US 2015/0042810 A1 Feb. 12, 2015

Related U.S. Application Data

(63) Continuation of application No. 12/713,828, filed on Feb. 26, 2010, now Pat. No. 8,874,475.

(51) Int. Cl.
| | |
|---|---|
| G06Q 50/06 | (2012.01) |
| G06Q 30/06 | (2012.01) |
| G06Q 50/10 | (2012.01) |
| G06Q 40/00 | (2012.01) |
| H04N 7/18 | (2006.01) |

(52) U.S. Cl.
CPC ............ *G06Q 50/06* (2013.01); *G06Q 30/06* (2013.01); *G06Q 40/12* (2013.12); *G06Q 50/10* (2013.01); *H04N 7/188* (2013.01)

(58) Field of Classification Search
CPC .................................................. G06Q 50/06
See application file for complete search history.

(56) References Cited

U.S. PATENT DOCUMENTS

| | | |
|---|---|---|
| 4,250,550 A | 2/1981 | Fleischer |
| 4,490,798 A | 12/1984 | Franks et al. |
| 4,658,371 A | 4/1987 | Walsh et al. |
| (Continued) | | |

FOREIGN PATENT DOCUMENTS

WO 95-21506 A2 8/1995

OTHER PUBLICATIONS

"EagleVision Gas Station Security Equipment With Service Station Software" (https://web.archive.org/web/20040628165411/http://www.eaglevision1.com/gas-station-security.htm) Jun. 2004.*

(Continued)

*Primary Examiner* — M. Thein
*Assistant Examiner* — Lance Cai
(74) *Attorney, Agent, or Firm* — Banner & Witcoff, Ltd.

(57) ABSTRACT

Fueling transactions (and other types of transactions) may be verified for legitimacy and validity by recording audio, video and/or images of the transaction as it occurs. The recordings may then be indexed according to one or more transaction parameters such as a driver identifier, a vehicle or transportation unit identifier, an invoice number, a fueling station and the like. A carrier associated with a driver and/or vehicle or other transportation unit may specify which transactions are to be recorded. Accordingly, the fueling station may automatically determine whether to record a transaction upon receiving a transaction initiation request. Transaction recordings may be made based on transaction recordation parameters defined by a carrier and stored and indexed based on transaction storing parameters.

20 Claims, 9 Drawing Sheets

(56) References Cited

U.S. PATENT DOCUMENTS

| | | |
|---|---|---|
| 4,804,937 A | 2/1989 | Barbiaux et al. |
| 5,400,018 A | 3/1995 | Scholl et al. |
| 5,694,322 A | 12/1997 | Westerlage et al. |
| 5,700,999 A | 12/1997 | Streicher et al. |
| 5,724,243 A | 3/1998 | Westerlage et al. |
| 5,819,234 A | 10/1998 | Slavin et al. |
| 5,862,222 A | 1/1999 | Gunnarsson |
| 5,913,180 A | 6/1999 | Ryan |
| 5,923,572 A | 7/1999 | Pollock |
| 5,970,481 A | 10/1999 | Westerlage et al. |
| 5,974,356 A | 10/1999 | Doyle et al. |
| 5,987,377 A | 11/1999 | Westerlage et al. |
| 6,045,040 A | 4/2000 | Streicher et al. |
| 6,072,402 A | 6/2000 | Kniffin et al. |
| 6,116,505 A | 9/2000 | Withrow |
| 6,124,810 A | 9/2000 | Segal et al. |
| 6,128,551 A | 10/2000 | Davis et al. |
| 6,154,658 A | 11/2000 | Caci |
| 6,195,019 B1 | 2/2001 | Nagura |
| 6,213,393 B1 | 4/2001 | Streicher et al. |
| 6,233,563 B1 | 5/2001 | Jefferson et al. |
| 6,338,008 B1 | 1/2002 | Kohut et al. |
| 6,343,241 B1 | 1/2002 | Kohut et al. |
| 6,370,454 B1 | 4/2002 | Moore |
| 6,389,337 B1 | 5/2002 | Kolls |
| 6,402,030 B1 | 6/2002 | Summers et al. |
| 6,441,732 B1 | 8/2002 | Laitsaari et al. |
| 6,554,183 B1 | 4/2003 | Sticha et al. |
| 6,574,603 B1 | 6/2003 | Dickson et al. |
| 6,598,792 B1 | 7/2003 | Michot et al. |
| 6,615,186 B1 | 9/2003 | Kolls |
| 6,616,036 B2 | 9/2003 | Streicher et al. |
| 6,738,697 B2 | 5/2004 | Breed |
| 6,747,365 B2 | 6/2004 | Reinold et al. |
| 6,856,820 B1 | 2/2005 | Kolls |
| 6,895,310 B1 | 5/2005 | Kolls |
| 6,899,151 B1 | 5/2005 | Latka et al. |
| 6,965,872 B1 | 11/2005 | Grdina |
| 6,991,160 B2 | 1/2006 | Demere |
| 7,379,920 B2 | 5/2008 | Leung et al. |
| 7,481,366 B2 | 1/2009 | Demere |
| 7,604,169 B2 | 10/2009 | Demere |
| 7,668,644 B2 | 2/2010 | Tengler et al. |
| 7,729,998 B2 | 6/2010 | Dickman |
| 8,051,006 B1 * | 11/2011 | Rourk ............................. 705/40 |
| 2002/0020742 A1 | 2/2002 | Streicher et al. |
| 2002/0065787 A1 | 5/2002 | Evers et al. |
| 2002/0072963 A1 | 6/2002 | Jonge |
| 2002/0160817 A1 | 10/2002 | Salmimaa et al. |
| 2002/0186144 A1 | 12/2002 | Meunier |
| 2003/0041330 A1 * | 2/2003 | Smith ............. B67D 7/068 725/105 |
| 2003/0083060 A1 | 5/2003 | Menendez |
| 2003/0107548 A1 | 6/2003 | Eun et al. |
| 2003/0120608 A1 | 6/2003 | Pereyra |
| 2003/0167345 A1 | 9/2003 | Knight et al. |
| 2003/0195676 A1 | 10/2003 | Kelly et al. |
| 2004/0140354 A1 | 7/2004 | Demere |
| 2004/0200897 A1 | 10/2004 | Demere |
| 2004/0215575 A1 | 10/2004 | Garrity |
| 2004/0243285 A1 | 12/2004 | Gounder |
| 2005/0035847 A1 | 2/2005 | Bonalle et al. |
| 2005/0102074 A1 | 5/2005 | Kolls |
| 2005/0125117 A1 | 6/2005 | Breed |
| 2005/0177859 A1 * | 8/2005 | Valentino et al. ............ 725/105 |
| 2005/0184155 A1 * | 8/2005 | Pinkus ........................ 235/449 |
| 2005/0197976 A1 * | 9/2005 | Tuton et al. ................. 705/417 |
| 2005/0234616 A1 | 10/2005 | Oliver et al. |
| 2005/0248444 A1 | 11/2005 | Joao |
| 2005/0273218 A1 | 12/2005 | Breed et al. |
| 2006/0012479 A1 | 1/2006 | Ezra |
| 2006/0018625 A1 | 1/2006 | Johnson et al. |
| 2006/0022842 A1 | 2/2006 | Zoladek et al. |
| 2006/0048845 A1 | 3/2006 | Slavin et al. |
| 2006/0052980 A1 | 3/2006 | LaFollette et al. |
| 2006/0108413 A1 | 5/2006 | Demere |
| 2006/0218056 A1 * | 9/2006 | Dickman ........................ 705/28 |
| 2007/0050279 A1 | 3/2007 | Huang et al. |
| 2007/0273763 A1 | 11/2007 | Smith |
| 2008/0040210 A1 | 2/2008 | Hedley |
| 2008/0091544 A1 | 4/2008 | Linlor |
| 2008/0208701 A1 | 8/2008 | Betancourt et al. |
| 2008/0214173 A1 | 9/2008 | Preiss et al. |
| 2009/0208701 A1 | 8/2009 | Grose et al. |
| 2010/0106641 A1 | 4/2010 | Chassin et al. |
| 2010/0332363 A1 | 12/2010 | Duddle et al. |

OTHER PUBLICATIONS

International Search Report & Written Opinion with a mailing date of Feb. 21, 2012, for International Application No. PCT/US2011/051210 (14 pages total).

US Office Action dated Dec. 23, 2010, corresponding U.S. Appl. No. 11/678,110.

US Office Action dated Mar. 2, 2011, corresponding U.S. Appl. No. 11/678,125.

Search Reort and Written Opinion dated May 9, 2011, corresponding PCT Application No. PCT/US2011/026288.

Office action for related U.S. Appl. No. 11/678,110 mailed May 31, 2011.

"Driving In-Store Sales with Fuel", Lofstock, John, Convience Store Decisions, Aug. 2007, p. 12.

"A new wave of user applications fuels satellite renasissance", Greenstein, Irwin, Network Management, Dec. 1989, p. 22.

* cited by examiner

RECORDINGS SEARCH

*700*

Recording type: — 701a
☒ Use for search?
☐ Audio
☐ Video
☐ Images

Driver ID — 701b
☒ Use for search?
[          ] [browse] — 707
709 —— 713 —— 717

Vehicle ID
☒ Use for search?
[          ] [browse] — 711

Invoice Number
☒ Use for search?
[          ] [browse] — 715

Recording time:
☒ Use for search?

Start date & time:
[17] [January ▷] [2010 ▷]
[9:30] [AM ▷]

End date & time:
[18] [January ▷] [2010 ▷]
[9:30] [AM ▷]

703

705

[clear] — 719    [search] — 721

FIG. 7

DEFINE A RECORDING RULE
_801_

Recording type:
- ☐ Audio  ☐ Hz
- ☒ Video  [30] FPS
- ☐ Images  [ ] second intervals

_803_

Recording time:
- ☐ Any time
- ☒ Time range:
- Start time: [10:30] [PM ▽]
- End time: [6:30] [AM ▽]

_805_

Storage:
- ☐ Store in server
- ☒ E-mail to: [         ]
- [Indexing....] _809_

_807_

Driver ID (select one or more)
```
All drivers
Driver 1
Driver 2
Driver 3
```
_811_

Vehicle ID (select one or more)
```
All vehicles
Vehicle 1
Vehicle 2
Vehicle 3
```
_813_

[Select States/Cities/Locations] _815_

[Select Fueling Stations] _817_

[clear]  [submit]

FIG. 8

METHOD AND SYSTEM FOR MANAGING AND MONITORING FUEL TRANSACTIONS

CROSS-REFERENCE TO RELATED APPLICATIONS

This application is a continuation of U.S. patent application Ser. No. 12/713,828 filed Feb. 26, 2010. The entire content of the priority application is incorporated herein by reference.

BACKGROUND

The fueling process constitutes an important aspect of transportation and carrier operations. For example, a trucking company may comprise a fleet of over 100 trucks. Given the distances that at least some of these trucks must travel, refueling at stops along a transit route is often needed. Because the carrier company pays for the costs of fuel, the fueling expenses incurred are generally tracked and monitored to insure legitimate refueling practices. However, in some instances, the legitimacy of a fuel transaction may be difficult to discern due to a lack of information. For example, visual evidence may be desirable to definitively determine if a vehicle other than a carrier's vehicle was fueled during a transaction charged to the carrier. In another example, auditory or visual evidence may be desirable to determine whether an individual other than an authorized driver (e.g., a driver associated with a carrier) is conducting a fueling transaction being charged to the carrier.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, video, audio and/or images may be recorded for a fuel transaction to insure that the transaction is authorized or otherwise legitimate. For example, the video, audio and/or images may be consulted to verify that the vehicle is a vehicle authorized to be refueled using a carrier account. In another example, the video, audio and/or images may be used to verify that the user refueling a vehicle or other transportation unit is an authorized user. The recorded audio, video and/or images may be stored and indexed according to one or more parameters. The indexing of the recorded information may facilitate the identification and retrieval of particular recordings. For example, a user may search for and retrieve recordings corresponding to a transaction performed by a particular user if the recordings are indexed according to user identifier. In another example, transactions may be indexed according to vehicle or transportation unit, thereby allowing users to retrieve transactions using a vehicle identifier or transportation unit identifier. In one or more arrangements, indexing recordings may comprise storing recordings in logical constructions such as folders that group recordings having similar indexes (e.g., vehicle identifiers, transit route number or code, user identifiers, fueling station, location). In one example, recordings may be organized according to the transit route assigned to the vehicle or driver at the time of refueling.

According to another aspect, transaction recordation may be automatically triggered by a user initiating a transaction by entering transaction information. For example, transaction recordation may be triggered upon receiving a request by a user to activate a fuel dispenser at a fueling station. The request to activate the fuel dispenser may be generated or received upon a user entering required transaction information such as a user identifier, a carrier identifier, a vehicle identifier and/or combinations thereof. In another example, transaction recordation may be automatically triggered by the detection of a passive element such as a radio frequency identifier (RFID) tag associated with a driver or a vehicle. Accordingly, when a vehicle having a sensor tag enters a sensor's range of a fuel dispenser, the fueling station (or system thereof) may automatically initiate a transaction recordation process.

According to another aspect, a transaction recordation process may include determining a carrier associated with the transaction, determining whether recordation is desired, recording the transaction according to one or more transaction recordation parameters if recordation desired and storing and indexing the recording. The indexing of the recording may be performed in accordance with indexing parameters specified by a carrier information system associated with a vehicle or driver associated with the transaction. In one or more arrangements, determining whether to record a transaction may be performed by a fuel station system by examining pre-stored recordation rules and/or by a carrier information system in response to receiving a notification from a fuel station that fuel transaction initiation has been requested.

According to yet another aspect, a carrier or user associated therewith may retrieve recordings by specifying one or more search parameters. The specified search parameters may then be compared to one or more attributes stored in association with the recording. The attributes stored in association with the recording may be selected based on desired indexing parameters.

According to still another aspect, if an applicable recording rule is not identified for a particular transaction, a system may automatically provide a prompt asking whether a recording rule should be defined. The system may automatically define the proposed rule with one or more attributes of the transaction (e.g., a driver identifier, a vehicle identifier, a fueling station, a transit route, a geographic location). The user may accept the rule or may modify or decline the rule.

BRIEF DESCRIPTION OF THE DRAWINGS

The present disclosure is illustrated by way of example and not limited in the accompanying figures in which like reference numerals indicate similar elements.

FIG. 7 illustrates an example user interface through which recording search/retrieval parameters may be defined according to one or more aspects described herein.

FIG. 8 illustrates an example user interface through which a user may define a transaction recording rule according to one or more aspects described herein.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
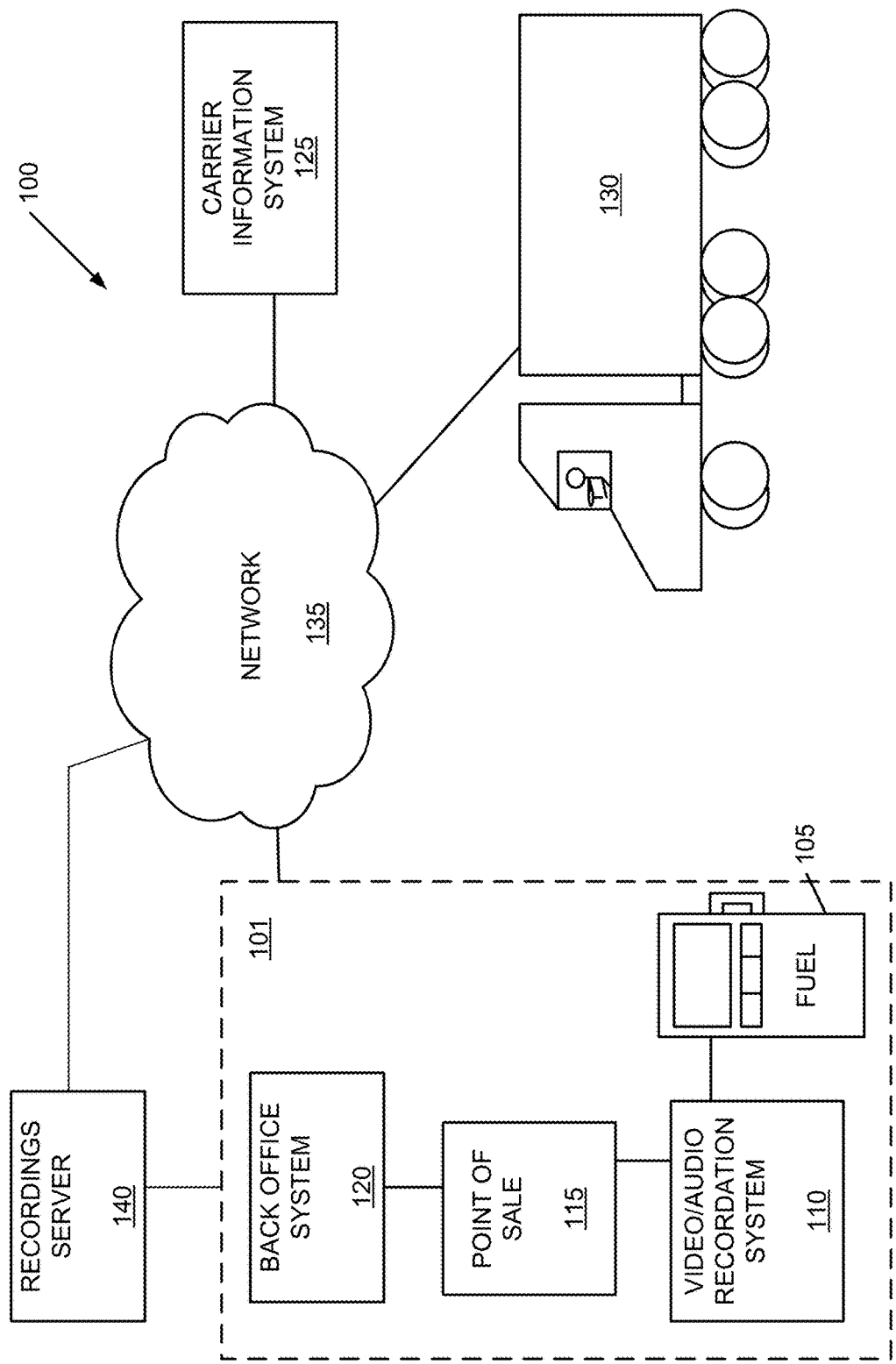
FIG. 1 illustrates an example of a suitable operating environment in which various aspects of the disclosure may be implemented.

FIG. 1 illustrates a fueling environment 100 in which vehicle 130 or a transportation unit (e.g., a refrigerated unit being transported by vehicle 130) may be refueled. Fueling station 101 may include a variety of systems including a point of sale 115 where a driver may initiate or complete a transaction (e.g., enter a pre-authorization code or enter payment information), a back office system for storing transaction information and managing processes throughout fuel station 101 and fuel dispenser 105. In one or more arrangements, point of sale 115 may be integrated with fuel dispenser 105. Additionally or alternatively, fuel station 101 may include a video, image and/or audio recordation system 110 configured to capture audio, video and/or images for a fuel transaction. The use of recordation system 110 allows for a carrier and/or the fuel station 101 to monitor and verify the legitimacy of various transactions. In one or more examples, time-lapse images may be captured upon a driver of truck 130 initiating a fueling transaction (e.g., pushing a start button or lifting a handle to activate a flow of fuel). In another example, audio may be captured to verify the identity of the driver. In yet another example, video may be recorded. Combinations of audio, video and/or images may be captured depending on the preferences of fuel station 101 or a carrier associated with the driver or truck 130.

According to one or more aspects, fuel station 101 may be connected to a carrier information system 125 through a wired and/or wireless communication network such as network 135. Fuel station 101 may consult carrier information system 125 to obtain authorization for fueling transactions and to determine whether a transaction should be recorded. For example, carrier information system 125 may store one or more rules that specify which transactions are to be recorded. These rules may identify specific drivers, vehicles, transportation units, times of day, and the like as parameters for determining whether a fueling station such as station 101 should record a particular transaction. The parameters may also specify the desired type of transaction (e.g., audio, video and/or images). Furthermore, the carrier may specify a manner in which the recordings are to be stored and indexed for retrieval.

Recordings may be stored on a server associated with fuel station 101 (e.g., in back office system 120) or in a storage system associated with carrier information system 125. For example, fuel station 101 may store the recordings in server 140 that may be situated in a physically different location than fuel station 101 or carrier information system 125. Alternatively, the storage server may be local to fuel station 101 or carrier information system 125. As noted, storage of the recordings in, for example, server 140 may include indexing so that a carrier or other entity may retrieve the recordings in a more efficient manner.

Figure 2:
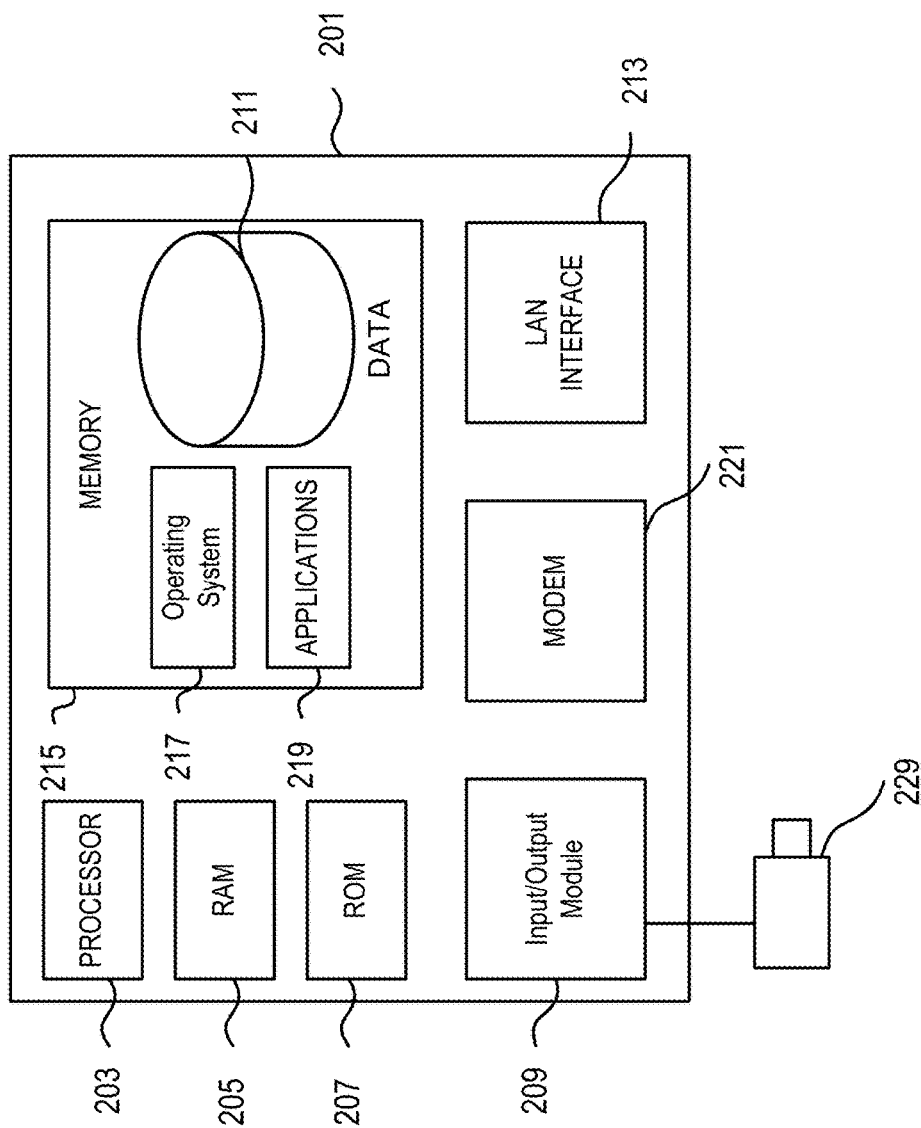
FIG. 2 illustrates an example network environment for processing financial transactions according to one or more aspects described herein.

FIG. 2 illustrates a block diagram of a generic computing device 201 (e.g., a point of sale system such as point of sale 115 of FIG. 1, a carrier server such as carrier information system 125 of FIG. 1, a back office system such as back office system 120 of FIG. 1, a fuel dispenser such as dispenser 105 of FIG. 1) in a computing environment that may be used according to an illustrative embodiment of the disclosure. The computer system 201 may have a processor 203 for controlling overall operation of the computing system 200 and its associated components, including random access memory (RAM) 205, read-only memory (ROM) 207, input/output (I/O) module 209, and memory 215.

I/O 209 may include a microphone, mouse, keypad, touch screen, scanner, optical reader, and/or stylus (or other input device(s)) through which a user of computer system 201 may provide input, and may also include one or more of a speaker for providing audio output and a video display device for providing textual, audiovisual and/or graphical output. In some arrangements, I/O 209 may comprise a video and/or audio capturing system 229 such as a video camera or the like. Output devices may further include a printer device (not shown), e.g., to a print or other record of a transaction. Software may be stored within memory 215 and/or other storage to provide instructions to processor 203 for enabling server 201 to perform various functions. For example, memory 215 may store software used by the computing system 201, such as an operating system 217, application programs 219, and an associated database 211. Alternatively, some or all of computing system 201 computer executable instructions may be embodied in hardware or firmware (not shown).

Computing device 201 may also be mobile terminals (e.g., mobile phones, PDAs, notebooks, etc.) including various other components, such as a battery, speaker, and antennas (not shown). Additionally or alternatively, computing device 201 may be connected to one or more networks through modem 221 or local area network (LAN) interface 213. In one or more examples, computing device 201 may have wired or wireless connections to one or more networks.

Figure 3:
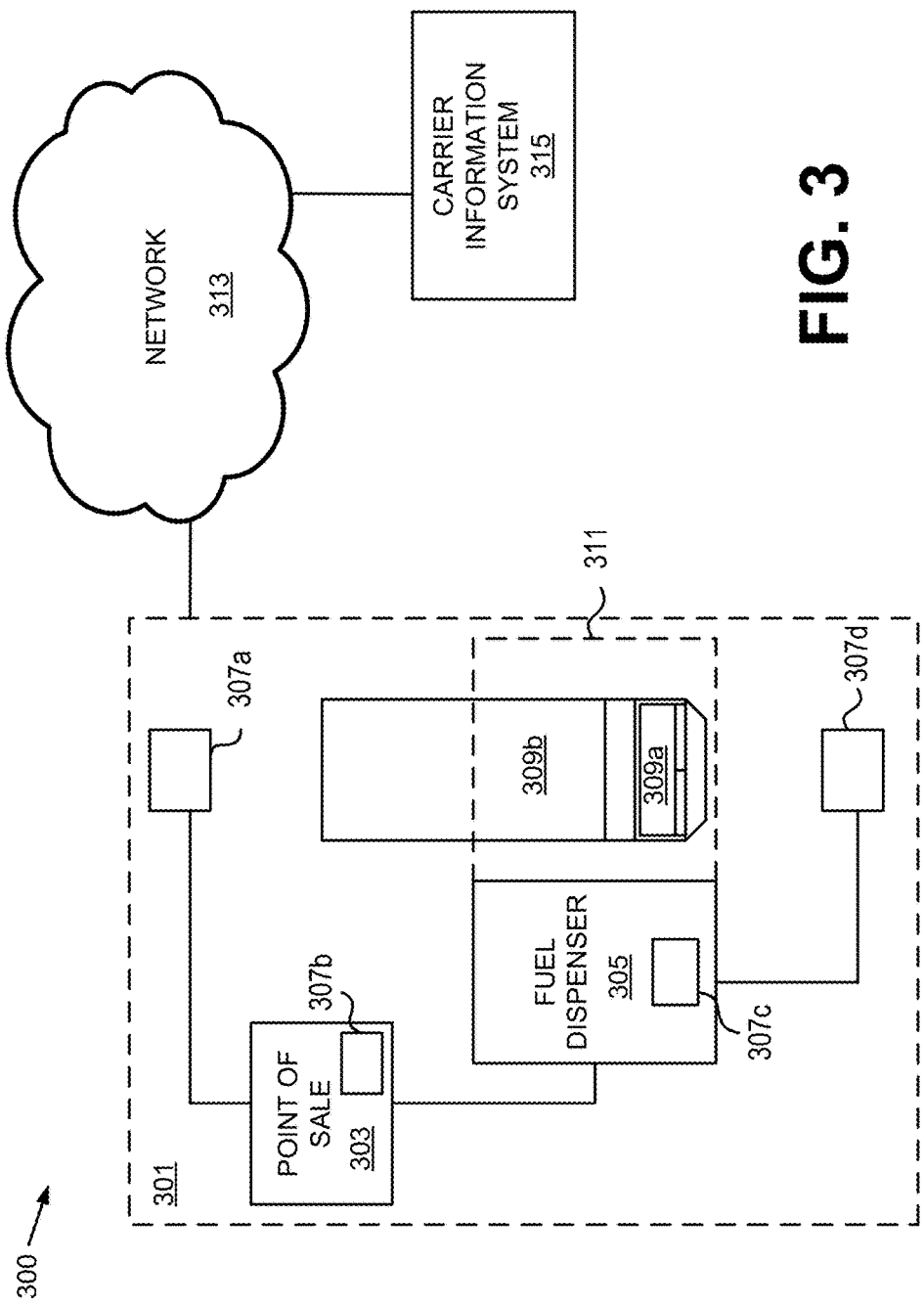
FIG. 3 illustrates an environment in which a fueling transaction may be performed according to one or more aspects described herein.

FIG. 3 illustrates an environment in which a fueling transaction may be processed and monitored. For example, environment 300 may support a fueling process whereby a vehicle, such as truck 309a, carrying a transportation unit such as trailer 309b enters fueling station 301 to re-fuel. In one or more arrangements, both truck 309a and trailer 309b may include fuel tanks and may be fueled separately. Fueling station 301 may include a point of sale system 303 in addition to fuel dispenser 305. Additionally or alternatively, fueling station systems may include devices and/or systems located within or associated with fueling station 301 (e.g., point of sale system 303, sensors systems, recording systems, a back office system, a corporate server for the fuel station company). In one or more arrangements, fueling station systems might only include systems located within a fueling station such as fueling station 301. Point of sale system 303 may comprise a cash register, a credit card payment processing system and/or combinations thereof. In one or more arrangements, point of sale system 303 may be included in fuel dispenser 305. Alternatively or additionally, point of sale system 303 may be separate from fuel dispenser 305 (e.g., within a store of fuel station 301 or an employee kiosk). Fuel dispenser 305 may include a fuel pump that is configured to dispense fuel into truck 309a. Further, fuel dispenser 305 may use a sensor to automatically sense the presence (or absence) of truck 309a. For example, the sensor may comprise a short range communication device such as BLUETOOTH communication device or an RFID sensor to detect when truck 309a enters area 311 if truck 309a includes a BLUETOOTH device or an RFID tag, respectively. Other short range sensors may be used including motion sensors, infrared sensors, weight sensors and the like. Such sensors may also be used to define a sensor area that is used to detect when truck 309a and/or trailer 309b enters fueling station 301.

Fueling station 301 may be connected to one or more other computing systems and locations through network 313. For example, fueling station 301 (and fuel dispenser 305 and point of sale system 303 thereof) may electronically communicate with carrier information system 315 corresponding to a carrier organization with which truck 309a and/or trailer 309b is associated. Thus, in one scenario, fuel transaction information may be transmitted to carrier information system 315 upon truck 309a or trailer 309b initiating or completing a fueling transaction. Carrier information system 315 may also provide information such as transaction approval, transaction parameters (e.g., a fueling cost limit), payment information (e.g., account number, company credit card number) to fueling station 301. A carrier information system such as carrier information system 315 may be identified by fuel station 301 based on information provided by a driver or other user associated with truck 309a. For example, the driver or user of truck 309a may be prompted to specify a user identifier and/or carrier identifier upon initiating a transaction. The carrier information system 315 may then be identified by the user identifier or carrier identifier. In another example, a transaction may be pre-authorized prior to truck 309a and/or trailer 309b arriving at station 301. In such an arrangement, a pre-authorization number may be entered at fueling station 301. Fueling station 301 may then determine a carrier information system from pre-authorized transaction information corresponding to the entered pre-authorization number.

In addition to transaction amounts, user identification information and vehicle information, fueling station 301 may further provide image, video and/or audio records to carrier information system 315. For example, each transaction may be recorded using video cameras 307. Depending on the preferences of a carrier or fueling station 301, one or more video cameras may be used to capture video from various perspectives. As discussed in further detail herein, video capture may be triggered by a driver of truck 309a initiating a transaction (e.g., submitting a pre-authorization code, providing all required transaction information prior to dispensation of fuel, receiving approval from a carrier), receiving instructions from carrier information system 315, based on a random selection and/or based on a predefined schedule (e.g., date/time). Video cameras 307 may be arranged such that truck 309a, trailer 309b or fueling area 311 may be captured from multiple angles. For example, video camera 307d may be positioned in front of fueling area 311 to capture the front of truck 309a while video camera 307a may be positioned in a rear position behind fueling area 311 to capture trailer 309b. Video camera 307c may be positioned on or within fuel dispenser 305 to provide a view from a side of truck 309a and trailer 309b. Additionally, video camera 307b may be positioned within point of sale 303 to provide, for example, images or video of the fueling individual (e.g., driver of truck 309a).

Video cameras 307 may record audio, video, still images and/or combinations thereof depending on the needs of a carrier, preferences of the fueling station and the like. For example, fueling station 301 might only record audio or still images to conserve bandwidth. In another example, the carrier may request video from cameras 307c and 307d but only audio from cameras 307a and 307b. One or more cameras 307 may be replaced or used in conjunction with other devices such as microphones and tactile sensors. Fueling station 301 may subsequently store and index the captured images, video and/or audio of the fueling transaction according to a transaction identifier, user identifier or other transaction information and provided to a carrier for review. For example, the captured video/audio/images may be indexed according to a transaction identifier and uploaded to a carrier accessible server or transmitted to an associated carrier. Indexing may aid retrieval and identification of relevant recordings and may comprise storing recordings or other information in folders or other logical organizational constructs. For example, the folders may be labeled with the specified index (e.g., a vehicle, a driver, etc.). In another example, indexing may relate to the types of information or attributes to define in metadata associated with the recording. Other information not specified as an index might not be stored or stored in association with the recording.

Figure 4:
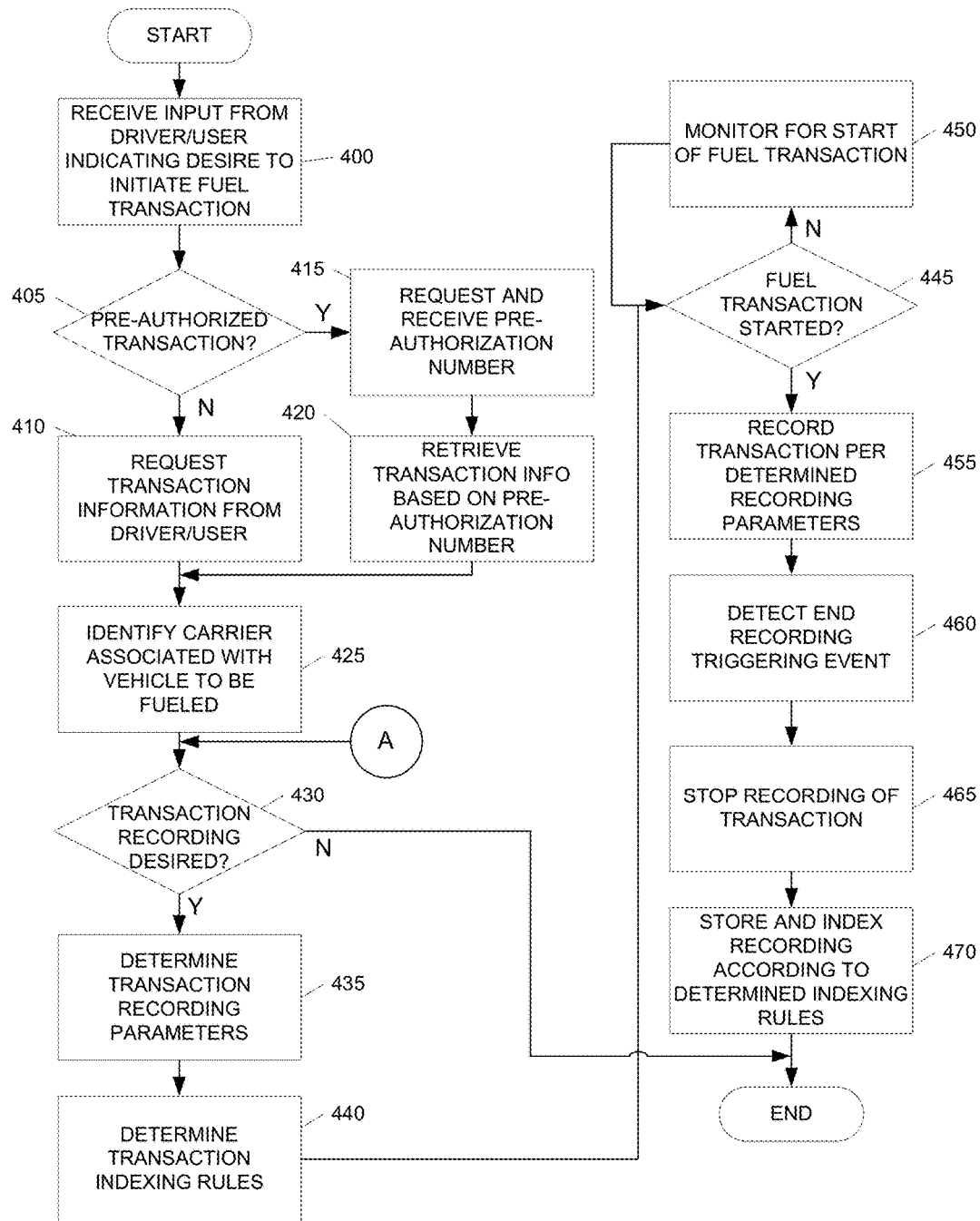
FIG. 4 illustrates an example method by which a system may process, record and index a fueling transaction according to one or more aspects described herein.

FIG. 4 illustrates a method by which image or video recording of a fuel transaction is automatically triggered by user initiation of a transaction. In step 400, a fuel dispenser may receive input from a driver or other user indicating a desire to initiate a fuel transaction. The input may correspond to selecting an option button for beginning a fuel transaction. In step 405, the fuel dispenser system may determine whether the transaction is a pre-authorized transaction by requesting that the user confirm whether the transaction is pre-authorized. If the transaction is not pre-authorized, the fuel dispenser system may request transaction information from the user in step 410. For example, the fuel dispenser system may request a user identifier (e.g., a driver's identification code), a carrier identifier, an account number for the carrier, a purchase order number and/or combinations thereof. If, on the other hand, the transaction is pre-authorized, the fuel dispenser system may request and receive a pre-authorization number for the transaction in step 415. Transaction information may subsequently be retrieved from a transaction database in step 420 using the transaction code entered by the user.

In step 425, a carrier may be identified based on the transaction information either received from the user (in the instance that the transaction is not pre-authorized) or retrieved from a database (in the instance that the transaction is pre-authorized). For example, the user may have specified a carrier by entering a carrier identification number. In another example, a database may store associations between driver IDs and carriers. In yet another example, carrier information may be stored in association with purchase order information. Various methods of identifying a carrier may be used. Upon determining the carrier, the fuel dispenser system may determine whether recording of the transaction is desired in step 430. The determination may be made, in one or more arrangements, by consulting a database that may store predefined rules indicating whether various carriers have requested recording and specifications on types of transactions to record. Alternatively or additionally, the database may be stored at a point of sale system or other server (e.g., fuel station back office system, carrier information system) and the information therein may be retrieved through a communication network such as a local area network (LAN) or a wide area network such as the Internet. A carrier may specify whether to record a particular transaction by identifying certain parameters that are to be met for recording. For example, a carrier might specify particular drivers or vehicles for which recording is to be performed. In another example, a carrier may indicate particular times (e.g., late at night or early morning) for which recording is desired. If no transaction recording is desired, the recording activation process may end (while a fueling transaction process may be allowed to continue without recordation).

If the carrier has requested recording of the transaction, the fuel dispenser system may subsequently determine transaction recording parameters in step 435. The transaction recording parameters may include the type of recording to be made (e.g., video, image, audio), a capture rate (e.g., 1 image every 20 seconds, 15 frames per second, audio quality), perspectives to record, a trigger to end the recording, maximum file size or total recording size (e.g., sum of all image files), and/or combinations thereof. In step 440, the fuel dispenser system may further determine transaction indexing rules or preferences based on the identified carrier. Indexing rules specify how the recorded information such as the images, video or audio is to be stored and indexed for searching. Indexing rules may include preferences such as whether the recordation is to be indexed by lane, by fuel station, fuel transaction, fuel isle (e.g., particular fuel dispenser), driver, vehicle, transaction cost, amount of fuel dispensed, transaction time and/or combinations thereof. Indexing and recording parameters may be determined from a local database (e.g., at the fueling station) if such information was previously stored. Alternatively or additionally, the fuel dispenser system may request such information from a carrier information system in an on-demand manner.

Once the transaction recording parameters and the transaction indexing options have been determined, the fuel dispenser system may determine whether the user has begun the fuel transaction in step 445. The beginning of the fuel transaction may correspond to when a user lifts a fuel gun from the fuel dispenser, upon the user lifting a lever of the fuel dispenser to activate the flow of fuel, upon the user selecting an option to activate the flow of fuel and the like. If the fuel transaction has not begun, the fuel dispenser system may continue to monitor for a transaction activation signal in step 450. Alternatively, if the transaction has begun, the fuel dispenser system may recording the transaction according to the determined recording parameters in step 455. For example, if the recording parameters specify taking time lapse images every 30 seconds from a fueling side and the front of the vehicle, the fuel dispenser system may begin taking images every 30 seconds using cameras having the specified perspectives.

In step 460, the fuel dispenser system may detect an end recording triggering event. This event may correspond to the completion of the fuel transaction (e.g., once all fueling input and output has been completed or user input indicating fueling is completed), placement of the fuel gun in the fuel dispenser, deactivation of the fuel gun, stoppage of the flow of fuel and the like. In response to the end recording triggering event, the fuel dispenser system may stop recording in step 465. Once the recording has been stopped, the fuel dispenser system may subsequently store and index the recording in a server in step 470. Indexing may be performed based on the determined indexing parameters. For example, if a carrier requests indexing by lane, fuel station and driver, the recording may be stored with metadata specifying each of the foregoing parameters and stored in a database using those parameters as keys. Alternatively or additionally, the recordings may be transmitted to a carrier (e.g., using e-mail).

By recording additional information which may include audio, video or images, fuel transactions may be audited or screened with greater accuracy. Accordingly, illegitimate transactions that might otherwise not be identifiable due to a lack of sufficient evidence or information may be identified. Some or all of the steps described above with respect to FIG. 4 may be performed by other systems such as a point of sale system separate (e.g., separate from the fuel dispenser system), a fueling station back office system or the like. Additionally, the recording may be encrypted for added security.

Figure 5:
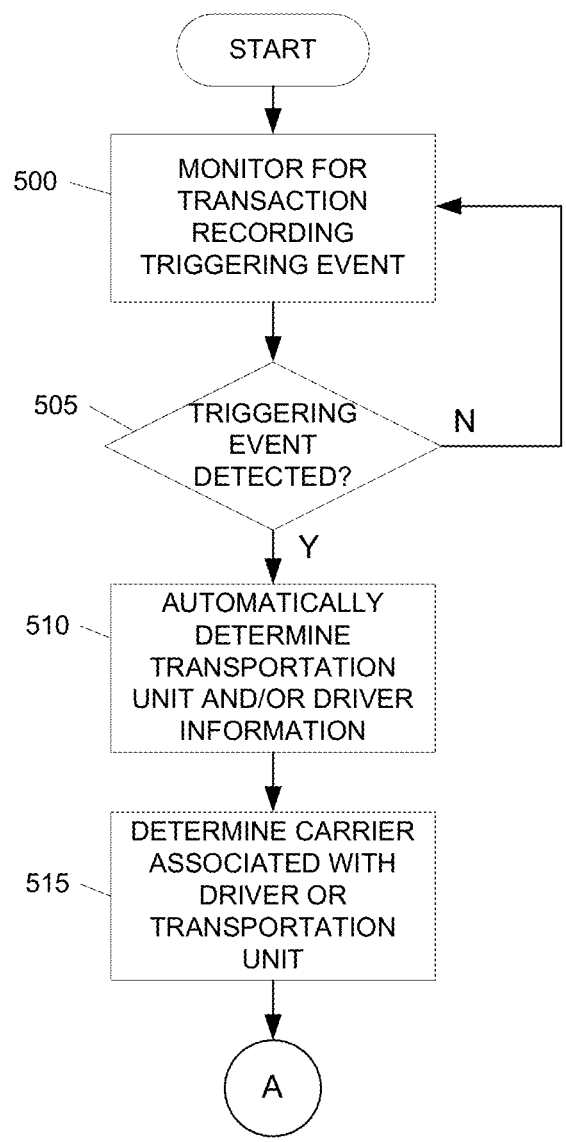
FIG. 5 illustrates an example method by which a transaction recording process may be passively triggered according to one or more aspects described herein.

FIG. 5 illustrates a method by which recording of a fuel transaction may be automatically triggered by a passive action (e.g., one that does not require user input into a fuel station system). In step 500, a fuel dispenser system may monitor for a recording triggering event. The recording triggering event may be defined by the fueling station and include, for example, the detection of an RFID tag within a specified region. A RFID sensor may be attached or otherwise connected to a fuel dispenser so that a vehicle or driver having an RFID tag may be detected within a predetermined range of the fuel dispenser. Since RFID sensors/tags tend to be short-range in nature, the arrival of a vehicle near a first fuel dispenser might not register as entering a region near a second fuel dispenser. In step 505, the fuel dispenser system may determine whether the triggering event has been detected. In the above example, the triggering event may comprise the detection of an RFID tag entering the sensor area. If no triggering event has been detected, the fuel dispenser system may return to monitoring in step 500.

If, however, the triggering event is detected, the fuel dispenser system may automatically determine information associated with the vehicle or the driver in step 510. The automatic determination of the information may include retrieving data stored from an RFID tag. The RFID tag may include information such as a carrier identifier, a driver identifier, a vehicle identifier and the like. In step 515, the fuel dispenser system may subsequently determine a carrier based on the information determined in step 510. Once a carrier has been identified, the process may proceed in similar fashion to steps 430-470 of FIG. 4. For example, the system may determine if transaction recording is desired and if so, determine transaction recording and indexing parameters. The transaction may subsequently be recorded based on a recording triggering event and indexed according to desired parameters.

Figure 6:
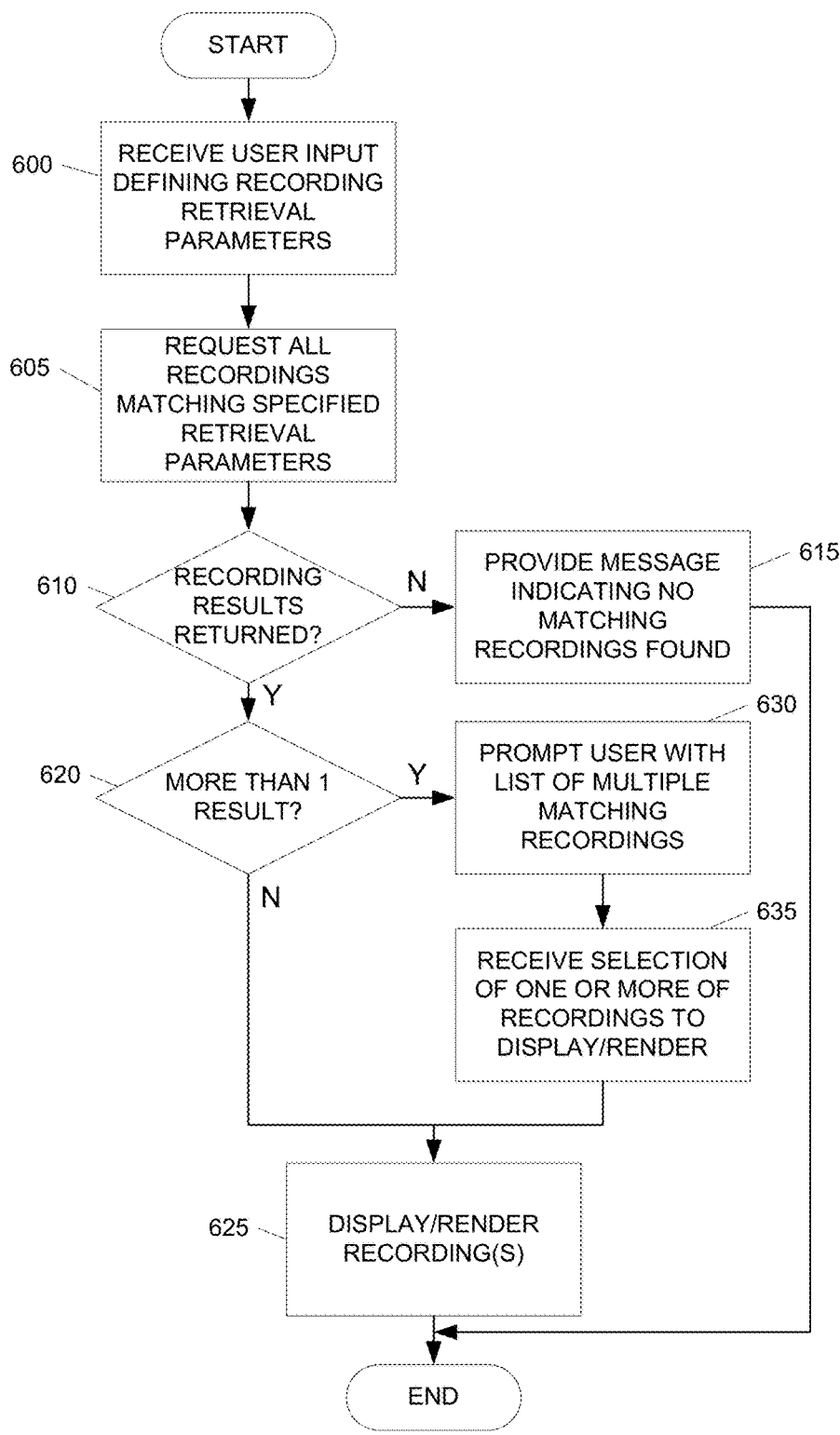
FIG. 6 illustrates an example method by which a user may retrieve transaction recordings according to one or more aspects described herein.

FIG. 6 illustrates a method by which a carrier may retrieve recordings for fueling transactions. In step 600, a carrier system may receive user input defining transaction recording retrieval parameters. Retrieval parameters may include a start time, an end time, a minimum or maximum transaction cost, transaction identifier (e.g., invoice number), a lane number, a fuel dispenser number, a fueling station identifier, a transit route, a truck identifier, a driver identifier, one or more specific recording perspectives, a maximum or minimum number of recording perspectives (e.g., camera perspectives), a frame rate, audio quality and/or combinations thereof. In one or more arrangements, the user input may include a selection of a transaction in question. The carrier system may then automatically define transaction recording retrieval parameters based on the attributes of the transaction. In step 605, a carrier information system may request all recordings matching the specified retrieval parameters from a recording server. In step 610, the carrier information system may determine whether any results were returned from the recording server. If not, the carrier information system may return a message indicating that no recordings were made in step 615. If recordings or indications thereof were returned, the carrier information system may determine if more than one recording was returned in step 620. If not, the carrier information system may display the single recording in step 625.

If multiple recordings were returned, the carrier information system may present a list of the returned recordings along with one or more attributes for user review in step 630. In step 635, the carrier information system may receive user input selecting one or more of the returned recordings and in response, display the selected recording(s) (e.g., as in step 625). In some embodiments, a carrier information system may retrieve a list of recordings matching the retrieval parameters prior to retrieving the recordings themselves. This may allow the carrier information system to conserve bandwidth by only retrieving those recordings that are actually needed or desired by the user.

In some arrangements, if no results were returned, the carrier information system may automatically prompt the user to determine whether a recording rule should be created based on the attributes of the transaction. For example, if the transaction in question corresponds to driver A and truck C, the carrier information may automatically retrieve these attributes and ask the user whether a recording rule should be created for driver A and truck C. The user may then have to the option to accept or decline the rule and/or to modify the rule by selecting or deselecting one or more of the suggested recording rule parameters. For example, the carrier information system may suggest a rule for recording all transactions for both driver A and truck C based on the attributes of a questionable transaction. However, a user may decide to only record transactions associated with the driver and not the vehicle, in which case, the user may deselect or clear the vehicle attribute from the suggested recording rule.

FIG. 7 illustrates a user interface through which a carrier employee or other user may select search parameters 703, 705, 707, 711 and 715 for identifying and retrieving fuel transaction recordings. Interface 700 may include multiple types of search parameters that may be activated or deactivated using an option such as use for search options 701. Accordingly, if a user does not wish to specify a driver identifier parameter, for example, the use for search option 701*b* may be unchecked or otherwise deactivated. If use for search option 701*b* is deactivated, the fields and options (e.g., browse option 709) may be deactivated (e.g., a user is not able to select that option).

User definable search parameters in interface 700 may include recording type 703, recording time 705, driver identifier 707, vehicle identifier 711 and invoice number 715. Other parameters that may be included comprise transaction amounts (maximum, minimum or range), fueling location (city, state, zip code, region, fuel station identifier) and the like. Recording type parameter 703 may allow a user to specify whether recordings having audio, video or images or combinations thereof are to be retrieved. For example, a user might only wish to retrieve recordings having video since video would provide evidence that the user needs to determine the legitimacy of a particular transaction since time-lapse images and audio might not be sufficient in certain situations. The user may also specify a range of time for which the search should be limited. For example, if illegitimate transactions are often performed late at night, the recording search may be limited to a corresponding range of times. Driver identifier 707 and vehicle identifier 711 may further be used to limit the search to particular drivers and/or vehicles. In one or more arrangements, driver identifier 707 and vehicle identifier 711 may allow a user to select multiple drivers or vehicles as search parameters for a single search. Browse options 709 and 713 may be used by the user to identify drivers or vehicles if user or vehicle identifiers are not known. For example, a user may search for a driver identifier by browsing for the driver's name, contact information, vehicle and/or combinations thereof. For vehicles, the user may search for a vehicle identifier by browsing for a make, model, cargo type, route, driver or the like. A search may also be limited using invoice number parameter 715 which includes a browse option 717 that functions similarly to browse options 709 and 713. An invoice number may correspond to an invoice received for a specific transaction or a group of transactions made. Transactions may be grouped by fueling company, fuel station, transaction amount, payment type and the like.

Once the search parameters have been defined, the user may select search option 721 to retrieve matching recordings. In some instances, if a user has made a mistake or wishes to restart the parameter selection process, the user may select clear option 719 to reset parameters 703, 705, 707, 711 and 715 to a default setting.

FIG. 8 illustrates a user interface through which a user may define or modify a transaction recording rule. Interface 801 allows a user to create a rule specifying how recordings are to be made. For example, interface 801 may include parameters 803, 805, 807, 811, 813, 815 and 817 that correspond to various attributes or aspects of recording a transaction. One attribute that may be defined is recording type 803. Recording type 803 may indicate the types of media to record, including audio, video and images. Additionally, a user may be allowed to specify the audio quality (e.g., in Hz), the video quality (e.g., in frames per second) and the time lapse between images (e.g., in seconds). The user may further define a range of time in which recordings are to be made using time parameter 805. In some arrangements, a user may wish to record at any time, while in other cases, the user may only wish to record transactions within a certain time range.

Additionally or alternatively, recordings might only be made for particular drivers or vehicles. The drivers and vehicles for which recordings are to be made may be defined using selection menu 811 and 813, respectively. Multiple drivers or vehicles may be selected for a particular recording rule. Furthermore, selection of location option 815 may cause a window or prompt to be displayed that allows the user to specify states, cities or zip codes to which the recordings are to be limited. Other methods of defining locations may include setting of GPS coordinates, specifying a continent or time zone and the like. Recordings may also be limited to one or more specific fueling stations using option 817, which, upon selection, may also cause a window or other prompt to be displayed for entry of user input. The prompt or window may include a listing of all fueling stations known and/or include a user definable field for selecting an unlisted fueling station.

Storage parameter 807 may also be defined by the user to specify a manner in which the recorded information (e.g., videos, images, audio) is to be stored and indexed. For example, a user may request that the information be stored in a server provided by either the carrier information system or a recording service provider. The user may, in addition to or as an alternative to storing the recordings in the server, ask that the recordings be transmitted to the user or a system thereof through electronic mail to a user-specified mail address. Other transmission methods may be used, e.g., postal mail of DVDs, FLASH drives or CDs with the recordings stored thereon. The user may also select indexing options 809 to specify a manner in which the recordings are to be indexed in a database or other storage facility. As noted herein, indexes may include, amount of fuel transacted, transaction time, carrier, driver, vehicle, fueling station, fueling lane, fueling dispenser, fueling company, recording type, location, transaction cost and/or combinations thereof. Accordingly, when a fueling station receives a transaction initiation request, the fueling station may determine the parameters of the recording rule to determine whether to record the transaction.

Figure 9:
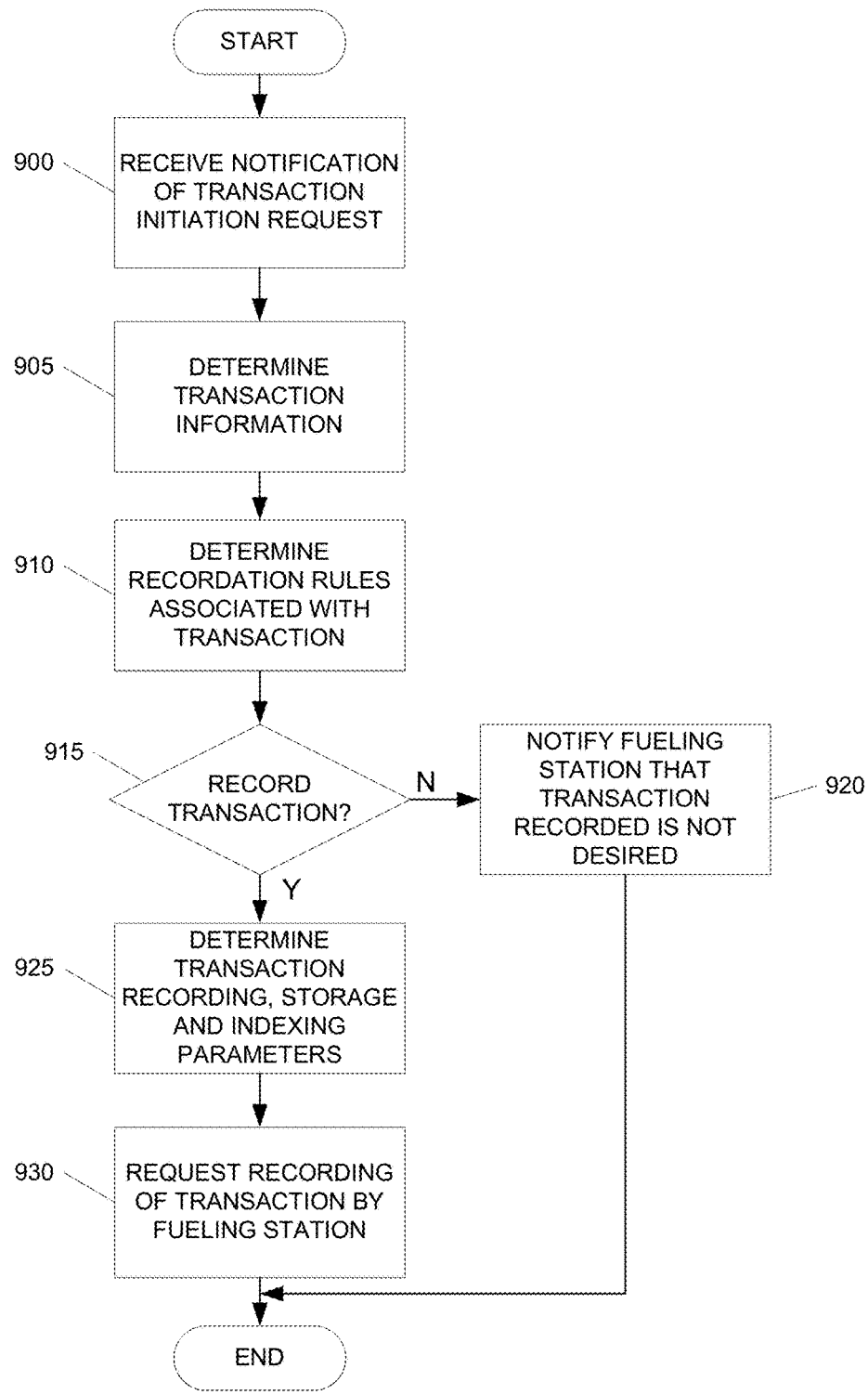
FIG. 9 illustrates an example method by which a carrier information system may determine whether transaction recording is desired and instruct a fueling station in accordance with the determination.

FIG. 9 illustrates an example method whereby a carrier information system may notify a fueling station as to whether transaction recording is desired. In step 900, for example, the carrier information system may initially receive a notification that a transaction initiation has been requested. The transaction initiation request may take the form of a user entering a pre-authorization code or entering requested transaction information into a point of sale at the fueling station. In response, the carrier information system may determine transaction information associated with the transaction initiation request in step 905. For example, the notification of the transaction initiation request received from the fueling station may be accompanied by or include information such as driver identification, vehicle identification, a time of the request and the like. Based on such information, the carrier information system may determine whether any recordation rules match one or more attributes specified in the transaction information. For instance, the carrier information system may search for all recording rules that are applicable to the driver, the vehicle or both. In another example, the carrier information system may search for all recording rules that apply to a current time or a time at which the transaction initiation request was submitted.

Once the carrier information system has determined matching recordation rules or the existence thereof, the carrier information system may then determine whether to record the transaction in step 915. This determination may be made based on whether any matching recordation rules were identified. If no matching recordation rules were identified, then a default do not record rule may apply. If, on the other hand, one or more recordation rules are identified, the carrier information system may compare the transaction information with the parameters specified in each of the one or more matching rules. If the transaction information satisfies the requirements set by the parameters of one or more rules, the carrier information system may determine that a recordation of the transaction is to be made. If, however, the transaction information does not satisfy one or more parameters of every matching rule, a recordation might not be made.

If the carrier information system determines not to record the transaction, the carrier information system may notify the fueling station that transaction recording is not needed or desired in step 920. If the carrier information system determines that the transaction is to be recorded, the carrier information system may determine transaction recording, storage and indexing parameters in step 925. For example, the carrier information system may identify the type of recording desired (e.g., audio, video, images), a number of perspectives to record, the types of perspectives (e.g., front of vehicle, fueling side of vehicle, opposite side of vehicle, back of vehicle, point of sale, etc.), storage preferences and the attributes according to which the recordings are to be indexed. In step 930, the carrier information system may transmit a request for recording the transaction to the fueling station. The request may include the recording, storage and indexing parameters.

Additionally or alternatively, the above methods, systems and apparatuses may be used to record fueling transactions involving transportation units other than vehicles. Transportation units may include refuelable components that are configured to carry various types of cargo other than fuel (e.g., perishable goods, other products, people). In one or more arrangements, the transportation units may be configured for attachment to a vehicle (e.g., a truck). In one example, the transportation unit may include a refrigerated trailer. Since some trailers or transportation units may require power, they may include their own fuel tanks for use in generating the requisite power (e.g., to keep the trailer refrigerated). The transportation units may be individually identifiable, e.g., using a unique identifier assigned by a carrier. Thus, even if a vehicle associated with a non-vehicle transportation unit is not being refueled, the recording and indexing processes described herein may be used for refueling the non-vehicle transportation unit.

The methods, systems and apparatuses described herein may be used to record numerous other types of transactions and is not limited to fuel transactions. For example, purchases made on a corporate credit card at various stores, restaurants or other businesses may be subject to recording if a company or organization issuing the card requests such information or features. In another example, car washes and purchases made within a fueling station (e.g., food) might also be subject to recordation should a carrier specify such a preference.

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, etc. that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. A method comprising:
   detecting, by a fueling station system at a fueling station, a triggering event corresponding to a transaction including fueling of a transportation unit, wherein detecting the triggering event comprises detecting a vehicle sensor entering a sensor area associated with the fueling station;
   in a case where the triggering event is detected:
      determining, by the fueling station system, a carrier associated with the transportation unit;
      verifying, by the fueling station system, that the transaction is authorized to use a carrier account based on information received from a carrier information system corresponding to the carrier associated with the transportation unit;
      in response to verifying that the transaction is authorized to use a carrier account, determining whether at least one of: video, audio and image recording of the transaction is desired, wherein the determination is made based on at least one recordation rule specified by the determined carrier;
      activating a recordation device to initiate automatic recording of the transaction by the fueling station system in response to determining that the at least one of: video, audio and image recording of the transaction is desired;
      deactivating the recordation device upon determining that the transaction has completed;
      storing and indexing the at least one of: video, audio and image recording according to one or more transaction attributes; and
      responsive to receiving a user selection associated with the one or more transaction attributes, retrieving the at least one of: video, audio and image recording.

2. The method of claim 1, wherein determining whether at least one of: video, audio and image recording of the transaction is desired includes:
   notifying the carrier information system of the transaction; and
   receiving, from the carrier information system, an indication as to whether at least one of: video, audio and image recording of the transaction is desired.

3. The method of claim 2, wherein the indication received from the carrier information system includes transaction recording parameters including a type of recording desired.

4. The method of claim 1, wherein storing and indexing the at least one of: video, audio and image recording includes transmitting the at least one of: video, audio and image recording to at least one of: the carrier and a recording database through a communication network, wherein the recording database is different from the carrier.

5. The method of claim 1, wherein determining whether the at least one of: video, audio and image recording of the transaction is desired includes determining transaction recording parameters including a number of perspectives to record.

6. The method of claim 1, wherein determining whether the at least one of: video, audio and image recording of the transaction is desired includes determining transaction recording parameters including a number of frames per second to be recorded in a video.

7. The method of claim 1, wherein verifying, by the fueling station system, that the transaction is authorized includes:
   determining whether the transaction is pre-authorized based on a user input, the user input including a pre-authorization code;
   in response to determining that the transaction is pre-authorized, receiving, by the fueling station, transaction information based on the pre-authorization code;
   in response to determining that the transaction is not pre-authorized, receiving, by the fueling station, transaction information from the user; and
   verifying that the transaction is authorized based on the received transaction information.

8. The method of claim 1, wherein determining, by the fueling station system, a carrier associated with the transportation unit includes receiving a carrier identification number.

9. The method of claim 8, wherein the carrier identification number is determined by the fueling station system based on at least one of a user-provided number, a driver-carrier database, and purchase order information.

10. The method of claim 1, wherein the triggering event comprises a user initiation of a transaction.

11. The method of claim 1, wherein detecting the triggering event further comprises detecting entry of the vehicle sensor into a sensor range of one fuel dispenser of a plurality of fuel dispensers associated with the fueling station.

12. The method of claim 11, wherein the device comprises a radio frequency identification (RFID) tag and wherein the fuel dispenser includes a short range sensor configured to detect RFID tags.

13. A method comprising:
   receiving, by a carrier information system, notification of a transaction initiation request for a fueling transaction associated with a transportation unit, wherein the notification is received from a fueling station system in response to detecting a vehicle sensor entering a sensor area associated with the fueling station system;
   verifying, by the carrier information system, that the fueling transaction is authorized to use a carrier account based on carrier information associated with the transportation unit;
   in a case where the notification of the transaction initiation request is received and the transaction is authorized to use a carrier account, determining, by the carrier information system, whether to record the fueling transaction corresponding to the transaction initiation; and
   in response to determining to record the fueling transaction:
      determining one or more transaction recording parameters based on the carrier information associated with the transportation unit;
      activating a recordation device to initiate recording of the transaction to the fueling station system, the request including the one or more transaction recording parameters and one or more indexing parameters defining a manner in which a transaction recording is to be indexed;

deactivating the recordation device upon determining that the transaction has completed;

storing and indexing the recording of the transaction according to the one or more indexing parameters; and responsive to receiving a user selection associated with the one or more indexing parameters, retrieving the recording of the transaction.

14. The method of claim 13, wherein verifying, by the carrier information system, that the fueling transaction is authorized to use a carrier account includes receiving a pre-authorization code.

15. The method of claim 13, wherein the one or more transaction recording parameters includes at least one of a type of recording to make and a number of perspectives to record.

16. The method of claim 13, wherein the one or more indexing parameters include at least one of fuel station, fuel transaction, fuel isle, driver, vehicle, transaction cost, amount of fuel dispensed, and transaction time.

17. The method of claim 13, wherein in response to determining not to record the fueling transaction, notifying the fueling station system that recording of the transaction is not desired.

18. The method of claim 13, wherein determining, by the carrier information system, whether to record a fueling transaction corresponding to the transaction initiation request includes:

determining one or more attributes of the fueling transaction from the notification of the transaction initiation request; and determining one or more recordation rules matching the one or more attributes of the fueling transaction, wherein determining whether to record the fueling transaction includes determining whether the one or more attributes of the transaction satisfies the one or more recordation rules.

19. The method of claim 18, wherein the one or more recordation rules specifies a range of times during which recordings are desired.

20. An apparatus comprising:

a processor; and memory operatively coupled to the processor and storing computer readable instructions that, when executed, cause the apparatus to:

detect, at a fueling station, a triggering event corresponding to a transaction including fueling of a transportation unit, wherein detecting the triggering event comprises detecting a vehicle sensor entering a sensor area associated with the fueling station;

in a case where the triggering event is detected:

determine a carrier associated with the transportation unit;

verify that the transaction is authorized to use a carrier account based on information received from a carrier information system corresponding to the determined carrier in response to verifying that the transaction is authorized to use a carrier account, determine whether at least one of: video, audio and image recording of the transaction is desired, wherein the determination is made based on at least one recordation rule specified by the determined carrier;

activating a recording device to initiate automatic recording of the transaction by the fueling station in response to determining that the at least one of: video, audio and image recording of the transaction is desired;

deactivating the recordation device upon determining that the transaction has completed;

index the at least one of: video, audio and image recording according to one or more transaction attributes; and responsive to receiving a user selection associated with the one or more transaction attributes, retrieving the at least one of: video, audio and image recording.

* * * * *